United States Patent Office 3,476,756
Patented Nov. 4, 1969

3,476,756
2 - SUBSTITUTED - 1 - HYDROXYQUINAZOLINE 3-OXIDES AND QUINAZOLINE 1,3-DIOXIDES
Edward C. Taylor and Juan Bartulin, Princeton, N.J. (both of 1500 Spring Gardens St., Philadelphia, Pa. 19101)
No Drawing. Filed Feb. 7, 1967, Ser. No. 614,394
Int. Cl. C07d 51/48; A61k 27/00
U.S. Cl. 260—256.4                                   13 Claims

ABSTRACT OF THE DISCLOSURE 2-mono or disubstituted 1-hydroxy-1,2-dihydroquinazoline 3-oxides, prepared by reaction of an aldehyde or ketone with o-hydroxylaminobenzaldoxime. Quinazoline 1,3-dioxides are prepared by oxidation of a 1-hydroxy-1,2-dihydroquinazoline 3-oxide, which is mono or unsubstituted at the 2-position, with chloranil, benzoquinone, or mercuric oxide. The compounds possess diuretic, antiinflammatory, anthelmintic, muscle relaxant, and analgesic activities.

---

This invention relates to substituted quinazoline compounds. In particular, the invention relates to quinazoline compounds, oxygenated at the 1 and 3-positions, and optionally substituted at the 2-position, which compounds have pharmacological activity.

The compounds of this invention are represented by the following structural formulas:

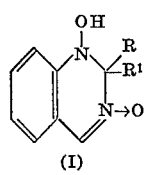 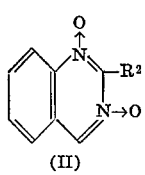
    (I)              (II)

where

R is hydrogen; lower alkyl of 1 to 5 carbon atoms; chloromethyl; phenyl substituted by hydroxy, methoxy, dimethylamino, chloro, bromo, methyl, or trifluoromethyl; furyl; thienyl; or pyridyl;

$R^1$ is hydrogen, lower alkyl of 1 to 5 carbon atoms, or together with $R^1$ can be lower alkylene of 3 to 7 carbon atoms; and $R^2$ is hydrogen; lower alkyl of 1 to 5 carbon atoms; chloromethyl; phenyl; phenyl substituted by hydroxy, methoxy, dimethylamino, chloro, bromo, methyl, or trifluoromethyl; o-nitrophenyl; furyl; thienyl; or pyridyl.

The term "lower alkyl" is intended to comprehend such groups as methyl, ethyl, propyl, isopropyl, butyl, isobutyl, tert-butyl, and pentyl. It is also intended that the definition of the permissible substituted phenyl groups include, with the exception of the nitrophenyl group, the ortho, meta, and para-substituted phenyl groups. Only the ortho-nitrophenyl compound is intended to be included. The terms "furyl" and "thienyl" are intended to refer to those groups bonded at the 2 or 3-positions. The term "pyridyl" is intended to refer to the 2, 3, or 4-pyridyl groups.

Also part of the present invention are the pharmaceutically acceptable acid addition salts of the basic compounds of Formulas I and II. Preferred salts include the hydrochloride, hydrobromide, sulfate, maleate, tartrate, and citrate. They are prepared in the conventional manner by conventional reaction of the acid and base, either or both of which may be in the form of an acetone or alcohol solution.

The compounds of Formula I are 1-hydroxy-1,2-dihydroquinazoline 3-oxides. They are prepared in high yield by the acid-catalyzed reaction of an aldehyde or ketone of the formula

where R and $R^1$ are as defined above, with o-hydroxylaminobenzaldoxime (III).

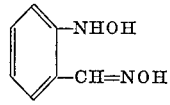

(III)

Aliphatic aldehydes and ketones react exothermically with III in ethanolic solution, the reaction being complete in a few minutes. Aromatic aldehydes react somewhat more slowly, but the yields are almost quantitative. The preferred acid catalyst is acetic acid and the preferred solvent is ethanol, although other common acid catalysts and organic solvents are usable. Recrystallization is achieved from such solvents as ethanol or benzene.

The compounds of Formula II are quinazoline 1,3-dioxides. They are prepared by dehydrogenation of the corresponding compounds of Formula I, where $R^1$ is hydrogen. The oxidizing agents used for this purpose are chloranil, p-benzoquinone, and mercuric oxide. The preferred procedure involves treating a warm ethanolic solution of the 1-hydroxy-1,2-dihydroquinazoline 3-oxide with chloranil. The product generally separates in high yield. Oxidation of the 2-aryl derivatives is best accomplished in warm dimethylformamide. Certain of the quinazoline 1,3-dioxides, when prepared by oxidation with chloranil, are obtained as complexes with tetrachlorohydroquinone. Among these compounds are the 2-ethyl, 2-propyl, and 2-isopropyl compounds. They are therefore more conveniently prepared by oxidation with mercuric oxide.

The compounds of Formula I are active as diuretics and are also useful as intermediates for preparing the compounds of Formula II, which are also diuretics. In addition to the diuretic activity common to all the compounds of the invention, some compounds possess additional activities. For example, the compound of Formula I where R is isopropyl and $R^1$ is hydrogen, and the compounds of Formula II where $R^2$ is phenyl or p-methoxyphenyl are muscle relaxants. The compound of Formula I where R is isopropyl and $R^1$ is hydrogen and the compounds of Formula II where $R^2$ is p-methoxyphenyl or p-dimethylaminophenyl are active as anti-inflammatory agents in rats at a dose of 25 mg./kg. The compounds of Formula I where R is propyl and $R^1$ is hydrogen has analgesic activity in rats at 50 mg./kg. and the compound of Formula II where $R^2$ is 2-furyl possesses anthelmintic activity against S. obvelata in mice at a dose of 100 mg./kg. The compounds have been found effective as diuretics in rats at oral doses of 15–30 mg./kg. They may be formulated for pharmaceutical use into capsules, tablets, syrups, or parenteral compositions by combining them with standard pharmaceutical excipients according to well-known techniques. Each tablet or capsule may contain 25–500 mg. A syrup may contain up to 250 mg. of compound per 5 cc. A parenteral form for intravenous injection may contain up to 500 mg. of compound per 20 cc. Muscle relaxation has been observed at oral doses of 300 mg./kg. in rats.

The following examples are intended to illustrate the preparation of the product and intermediate compounds of the invention.

EXAMPLE 1

1-hydroxy-2-isopropyl-1,2-dihydroquinazoline 3-oxide

To a solution of 15.2 g. (0.1 mole) of o-hydroxyaminobenzaldoxime in 100 ml. of ethanol is added 7.92 g. (0.11 mole) of isobutyraldehyde and 3 drops of acetic acid. The mixture is allowed to stand for 3 hours. The mixture is cooled and scratched, and the separated product removed by filtration and washed consecutively with ethanol and ether. The product is recrystallized from ethanol or benzene and melts at 162°.

EXAMPLE 2

When the following aldehydes and ketones are condensed with o-hydroxylaminobenzaldoxime in the same molar proportions as in Example 1, the following products are obtained. In the case of the aromatic aldehydes, the reaction time should be 12 hours, although this time may be shortened to about 1 hour by heating the reaction mixture on the steam bath.

Aldehyde: formaldehyde
Product: 1-hydroxy-1,2-dihydroquinazoline 3-oxide, M.P. 152°, dec.

Aldehyde: acetaldehyde
Product: 1-hydroxy-2-methyl-1,2-dihydroquinazoline 3-oxide, M.P. 136–137°, dec.

Aldehyde: propionaldehyde
Product: 1-hydroxy-2-ethyl-1,2-dihydroquinazoline 3-oxide, M.P. 130–132°, dec.

Aldehyde: butyraldehyde
Product: 1-hydroxy-2-propyl-1,2-dihydroquinazoline 3-oxide, M.P. 138–140°, dec.

Aldehyde: benzaldehyde
Product: 1-hydroxy-2-phenyl-1,2-dihydroquinazoline 3-oxide, M.P. 175°, dec.

Aldehyde: furan-2-carboxaldehyde
Product: 1-hydroxy-2-(2-furyl)-1,2-dihydroquinazoline 3-oxide, M.P. 160–161°, dec.

Aldehyde: p-methoxybenzaldehyde
Product: 1-hydroxy-2-(p-anisyl)-1,2-dihydroquinazoline 3-oxide, M.P. 160°, dec.

Aldehyde: p-dimethylaminobenzaldehyde
Product: 1-hydroxy-2-(p-dimethylaminophenyl)-1,2-dihydroquinazoline 3-oxide, M.P. 196–197°, dec.

Aldehyde: o-hydroxybenzaldehyde
Product: 1-hydroxy-2-(o-hydroxyphenyl)-1,2-dihydroquinazoline 3-oxide, M.P. 162–163°, dec.

Aldehyde: chloroacetaldehyde
Product: 1-hydroxy-2-chloromethyl-1,2-dihydroquinazoline 3-oxide, M.P. 127–128°

Aldehyde: m-chlorobenzaldehyde
Product: 1-hydroxy-2-(m-chlorophenyl)-1,2-dihydroquinazoline 3-oxide Aldehyde: p-methylbenzaldehyde
Product: 1-hydroxy-2-(p-tolyl)-1,2-dihydroquinazoline 3-oxide Aldehyde: m-trifluoromethylbenzaldehyde
Product: 1-hydroxy-2-(m-trifluoromethylphenyl)-1,2-dihydroquinazoline 3-oxide Aldehyde: thiophene-2-carboxaldehyde
Product: 1-hydroxy-2-(2-thienyl)-1,2-dihydroquinazoline 3-oxide Aldehyde: pyridine-4-carboxaldehyde
Product: 1-hydroxy-2-(4-pyridyl)-1,2-dihydroquinazoline 3-oxide Aldehyde: o-nitrobenzaldehyde
Product: 1-hydroxy-2-(o-nitrophenyl)-1,2-dihydroquinazoline 3-oxide, M.P. 158°, dec.

Ketone: acetone
Product: 1-hydroxy-2,2-dimethyl-1,2-dihydroquinazoline 3-oxide, M.P. 170°

Ketone: chloroacetone
Product: 1-hydroxy-2-chloromethyl-2-methyl-1,2-dihydroquinazoline 3-oxide, M.P. 142°

Ketone: cyclopentanone
Product: 1-hydroxy-2,2-tetramethylene-1,2-dihydroquinazoline 3-oxide, M.P. 180°

EXAMPLE 3

2-methylquinazoline 1,3-dioxide

A warm (60°) saturated solution of 8.9 g. (0.05 mole) of 1-hydroxy-2-methyl-1,2-dihydroquinazoline 3-oxide in ethanol is stirred and 12.40 g. (0.05 mole) of chloranil is added over a period of 10–15 minutes. Cooling and rapid stirring causes the separation of the crystalline product, which is removed by filtration and washed with ethanol followed by ether. The crude product is recrystallized from ethanol or dimethylformamide and melts at 140°, dec.

Calc'd for $C_9H_8N_2O_2$: C, 61.36; H, 4.58; N, 15.90. Found: C, 61.16; H, 4.65; N, 15.65.

EXAMPLE 4

2-phenylquinazoline 1,3-dioxide

A warm (60°) saturated solution of 12.0 g. (0.05 mole) of 1-hydroxy-2-phenyl-1,2-dihydroquinazoline 3-oxide in dimethylformamide is stirred and 5.40 g. (0.05 mole) of p-benzoquinone is added over a period of 10–15 minutes. Cooling and rapid stirring causes the separation of the crystalline product, which is separated by filtration and washed with ethanol followed by ether. The product is recrystallized from ethanol or dimethylformamide and melts at 190°, dec.

Calc'd for $C_{14}H_{10}N_2O_2$: C, 70.58; H, 4.23; N, 11.76. Found: C, 70.59; H, 4.47; N, 11.95.

EXAMPLE 5

2-propylquinazoline 1,3-dioxide

To a stirred, warm (60°) solution of 10.3 g. (0.05 mole) of 1-hydroxy-2-propyl-1,2-dihydroquinazoline 3-oxide in ethanol is added 20 g. (0.1 mole) of mercuric oxide. When the color of the solid has changed to black, the warm solution is filtered. Cooling of the filtrate results in crystallization of the product, M.P. 140°, dec.

Calc'd for $C_{11}H_{12}N_2O_2$: C, 64.69; H, 5.92; N, 13.72. Found: C, 64.95; H, 6.03; N, 13.84.

EXAMPLE 6

When the following 1-hydroxy-1,2-dihydroquinazoline 3-oxides are oxidized with mercuric oxide in the same molar proportions as in Example 5, the following products are obtained.

1-hydroxy compound: 1-hydroxy-1,2-dihydroquinazoline 3-oxide
Product: quinazoline 1,3-dioxide, M.P. 190°, dec.

1-hydroxy compound: 1-hydroxy-2-isopropyl-1,2-dihydroquinazoline 3-oxide
Product: 2-isopropylquinazoline, 1,3-dioxide 1-hydroxy compound: 1-hydroxy-2-chloromethyl-,12-dihydroquinazoline 3-oxide
Product: 2 - chloromethylquinazoline 1,3 - dioxide, M.P. 170°, dec.

1-hydroxy compound: 1-hydroxy-2-ethyl-1,2-dihydroquinazoline 3-oxide
Product: 2-ethylquinazoline 1,3-dioxide, M.P. 155°, dec.

EXAMPLE 7

When the following 1-hydroxy-1,2-dihydroquinazoline 3-oxides are oxidized with chloranil in the same molar proportions as in Example 3, but using dimethylformamide as solvent, the following products are obtained.

1-hydroxy compound: 1-hydroxy-2-(2-furyl)-1,2-dihydroquinazoline 3-oxide

Product: 2-(2-furyl)quinazoline 1,3-dioxide, M.P. 145° dec.

1-hydroxy compound: 1-hydroxy-2-(p-anisyl)-1,2-dihydroquinazoline 3-oxide
Product: 2-(p-anisyl)quinazoline 1,3-dioxide, M.P. 198° dec.

1-hydroxy compound: 1-hydroxy-2-(p-dimethylaminophenyl)-1,2-dihydroquinazoline 3-oxide
Product: 2-(p-dimethylaminophenyl)quinazoline 1,3-dioxide, M.P. 175°, dec.

1-hydroxy compound: 1-hydroxy-2-(o-hydroxyphenyl)-1,2-dihydroquinazoline 3-oxide
Product: 2-(o-hydroxyphenyl)quinazoline 1,3-dioxide, M.P. 192–193°, dec.

1-hydroxy compound: 1-hydroxy-2-(m-chlorophenyl)-1,2-dihydroquinazoline 3-oxide
Product: 2-(m-chlorophenyl)quinazoline 1,3-dioxide 1-hydroxy compound: 1-hydroxy-2-(p-tolyl)-1,2-dihydroquinazoline 3-oxide
Product: 2-(p-tolyl)quinazoline 1,3-dioxide 1-hydroxy compound: 1-hydroxy-2-(m-trifluoromethylphenyl)-1,2-dihydroquinazoline 3-oxide
Product: 2-(m-trifluoromethylphenyl)quinazoline 1,3-dioxide 1-hydroxy compound: 1-hydroxy-2-(2-thienyl)-1,2-dihydroquinazoline 3-oxide
Product: 2-(2-thienyl)quinazoline 1,3-dioxide 1-hydroxy compound: 1-hydroxy-2-(4-pyridyl)-1,2-dihydroquinazoline 3-oxide
Product: 2-(4-pyridyl)quinazoline 1,3-dioxide 1-hydroxy compound: 1-hydroxy-2-(o-nitrophenyl)-1,2-dihydroquinazoline 3-oxide
Product: 2-(o-nitrophenyl)quinazoline 1,3-dioxide, M.P., 207–208°, dec.

EXAMPLE 8 o-Hydroxylaminobenzaldoxime

In a 10 l. 3-necked round-bottom flask, fitted with a mechanical stirrer and a reflux condenser, are placed 188 g. (3.5 mole) of technical ammonium chloride, 3 l. of water, and a solution of 498 g. (3 mole) of o-nitrobenzaldoxime in 3 l. of diethyl ether. The mixture is stirred and 422 g. (6 moles) of zinc dust (90% purity) added during the course of 2–3 hrs. As the addition proceeds, the temperature of the reaction mixture rises to the boiling point of the diethyl ether, and the zinc dust is added at such a rate as to maintain a gentle reflux. (The time required for the addition of the zinc dust can be shortened by employing external cooling for the reaction vessel.) Stirring is continued for 1 hr. after addition of the zinc dust is complete, the solution filtered (to remove zinc oxide), the filter cake washed with 500 ml. of ether, and the filtrate separated. The water layer is washed once with 200 ml. of ether, the ether layers combined and dried over anhydrous calcium chloride. The dried ether solution is then evaporated under reduced pressure and the residual solid stirred vigorously with 600 ml. of benzene. The mixture is filtered, the solid washed twice with benzene, then with petroleum ether and air dried. Yield, 345 g. (76%), M.P. 125°. Although this crude product is sufficiently pure for subsequent reactions, it can be recrystallized from chloroform.

We claim:
1. A compound having one of the following formulas:

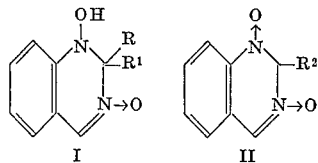

where
R is hydrogen, lower alkyl of 1 to 5 carbon atoms; chloromethyl; phenyl substituted by hydroxy, methoxy, dimethylamino, chloro, bromo, methyl, or trifluoromethyl; furyl; thienyl; or pyidyl;

$R^1$ is hydrogen, lower alkyl of 1 to 5 carbon atoms, or, together with $R^1$, lower alkylene of 3 to 7 carbon atoms; and $R^2$ is hydrogen; lower alkyl of 1 to 5 carbon atoms; chloromethyl; phenyl; phenyl substituted by hydroxy, methoxy, dimethylamino, chloro, bromo, methyl, or trifluoromethyl; o-nitrophenyl; furyl; thienyl; or pryidyl; or a pharmaceutically acceptable acid addition salt thereof.

2. A compound as claimed in claim 1, where the compound is represented by Formula I.

3. A compound as claimed in claim 2, where $R^1$ is hydrogen.

4. A compound as claimed in claim 1, where the compound is represented by Formula II.

5. A compound as claimed in claim 3, where R is isopropyl, being the compound 1-hydroxy-2-isopropyl-1,2-dihydroquinazoline 3-oxide.

6. A compound as claimed in claim 2, where R and $R^1$ are methyl, being the compound 1-hydroxy-2,2-dimethyl-1,2-dihydroquinazoline 3-oxide.

7. A compound as claimed in claim 3, where R is p-anisyl, being the compound 1-hydroxy-3-(p-anisyl)-1,2-dihydroquinazoline 3-oxide.

8. A compound as claimed in claim 3, where R is p-dimethylaminophenyl, being the compound 1-hydroxy-3 - (p - dimethylaminophenyl) - 1,2 - dihydroquinazoline 3-oxide.

9. A compound as claimed in claim 4, where $R^2$ is methyl, being the compound 2-methylquinazoline 1,3-dioxide.

10. A compound as claimed in claim 4, where $R^2$ is propyl, being the compound 2-propylquinazoline 1,3-dioxide.

11. A compound as claimed in claim 4, where $R^2$ is isopropyl, being the compound 2-isopropylquinazoline 1,3-dioxide.

12. A compound as claimed in claim 4, where $R^2$ is 2-furyl, being the compound 2-(2-furyl)quinazoline 1,3-dioxide.

13. A compound as claimed in claim 4, where $R^2$ is phenyl, being the compound 2-phenylquinazoline 1,3-dioxide.

References Cited

UNITED STATES PATENTS 3,398,139    8/1968    Field et al. _____ 260—256.4

ALEX MAZEL, Primary Examiner

R. J. GALLAGHER, Assistant Examiner

U.S. Cl. X.R.

260—251, 566; 424—251

PO-1050
(5/69)

UNITED STATES PATENT OFFICE
CERTIFICATE OF CORRECTION

Patent No. 3,476,756            Dated November 4, 1969

Inventor(s) Edward C. Taylor and Juan Bartulin

It is certified that error appears in the above-identified patent and that said Letters Patent are hereby corrected as shown below:

Claim 1

Formula II should be 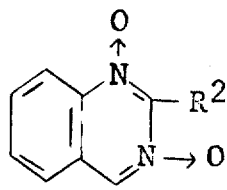 rather than 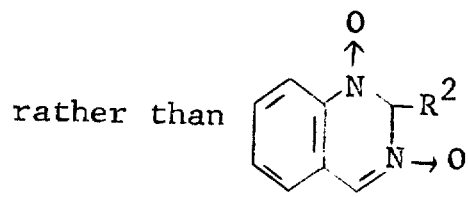

5th line after structures, "pyidyl" should be ---pyridyl---

13th line after structures, "pryidyl" should be ---pyridyl---

SIGNED AND
SEALED
FEB 17 1970

(SEAL)
Attest:

Edward M. Fletcher, Jr.
Attesting Officer

WILLIAM E. SCHUYLER, JR.
Commissioner of Patents